United States Patent
Paris et al.

(10) Patent No.: US 9,235,063 B2
(45) Date of Patent: Jan. 12, 2016

(54) LENS MODELING

(75) Inventors: Sylvain Paris, Boston, MA (US); Eric R. Kee, Hanover, NH (US); Simon Chen, San Jose, CA (US); Jue Wang, Kenmore, WA (US)

(73) Assignee: Adobe Systems Incorporated, San Jose, CA (US)

( * ) Notice: Subject to any disclaimer, the term of this patent is extended or adjusted under 35 U.S.C. 154(b) by 869 days.

(21) Appl. No.: 12/957,300

(22) Filed: Nov. 30, 2010

(65) Prior Publication Data

US 2013/0132044 A1   May 23, 2013

Related U.S. Application Data

(60) Provisional application No. 61/381,375, filed on Sep. 9, 2010.

(51) Int. Cl.
  G06G 7/48   (2006.01)
  G02C 7/02   (2006.01)

(52) U.S. Cl.
  CPC .................................... G02C 7/028 (2013.01)

(58) Field of Classification Search
  None
  See application file for complete search history.

(56) References Cited

PUBLICATIONS

Bertero et al. "Image deblurring with Poisson data: from cells to galaxies", Inverse Problems 25, Nov. 23, 2009, 26 pages.*
Datta et al. "Accurate Camera Calibration using Iterative Refinement of Control Points", 2009 IEEE 12th International Conference on Computer Vision Workshops, Sep. 27, 2009, pp. 1201-1207.*
Guerrero-Colon et al. "Deblurring-By-Denoising Using Spatially Adaptive Gaussian Scale Mixtures in Overcomplete Pyramids", IEEE, 2006, pp. 625-628.*
N. Joshi, R. Szeliski, and D. Kriegman. Psf estimation using sharp edge prediction. In IEEE Conference on Computer Vision and Pattern Recognition, Anchorage, Alaska, Jun. 2008, 8 pages.
DxO. Dxo optics. In http://www.dxo.com, 2010, 1 page.
S. Lee, E. Eisemann, and H.-P. Seidel. Real-time lens blur effects and focus control. In SIGGRAPH '10: ACM SIGGRAPH, 2010 papers, pp. 1-7, New York, NY, USA, 2010. ACM.
A. Levin, R. Fergus, F. Durand, and W. T. Freeman. Image and depth from a conventional camera with a coded aperture. In http://groups.csail.mit.edu/graphics/CodedAperture, 2007, 2 pages.
Z. Wang, A. C. Bovik, H. R. Sheikh, and E. P. Simoncelli. Image quality assessment: from error visibility to structural similarity. IEEE Transactions on Image Processing, 13(4):600-612, 2004.

* cited by examiner

*Primary Examiner* — Suzanne Lo
(74) *Attorney, Agent, or Firm* — Wolfe-SBMC

(57) ABSTRACT

Techniques are disclosed relating to lens modeling. In one embodiment, a lens model may be generated based on reference images of a pre-determined, known geometric pattern. The lens model may represent a spatially variant blur pattern across the image field of the lens used to capture the reference images. In one embodiment, the lens model may include Gaussian approximations of the blur that may minimize the difference between a location within a reference image and a corresponding location of a pre-determined, known geometric pattern. In one embodiment, the generated lens model may be applied to deblur a new image.

17 Claims, 9 Drawing Sheets

LENS MODELING

PRIORITY INFORMATION

This application claims benefit of priority of U.S. Provisional Application Ser. No. 61/381,375 entitled "System and Method for Creating Lens Models to Reduce Image Blur" filed Sep. 9, 2010, the content of which is incorporated by reference herein in its entirety.

BACKGROUND

1. Technical Field

This disclosure relates to generally to lenses, and, more specifically, to lens modeling

2. Description of the Related Art

Cameras are light capturing devices. Light rays emanate from some source, such as the sun, and travel through space until striking some object. When the light rays reach the object, the object absorbs much of the light spectrum, and what is not absorbed is reflected. In the case of cameras, some of the reflected light enters the optics of the camera and is collected by the camera sensor (or film) at the image plane. The geometric configuration of the passage of the light rays, from the object through the lens(es) to the image plane, can be described mathematically by a parametric model, which may be referred to as the camera model.

Camera lenses typically include design compromises, aberrations, and other imperfections that may introduce the aberrations into the captured image. Lens aberrations may include, but are not limited to, geometric distortion, lateral chromatic aberration, and vignetting. Most, if not all, captured images include at least some geometric distortion, such as blur, introduced primarily by the camera lens components.

SUMMARY

This disclosure describes techniques and structures that facilitate lens modeling. In one embodiment, a lens model may be generated based on reference images of a pre-determined, known geometric pattern. The lens model may model the lens at various settings, including settings not used in the reference images (i.e., at a unique focal length and/or aperture from the focal length and aperture used in the reference images). In one embodiment, the lens model may represent a spatially variant blur pattern across the image field of the lens used to capture the reference images. A spatially variant blur pattern may include minimal blur at the center of an image field with increasing blur toward the edges of the image field. The spatially variant blur pattern may also be asymmetric. In one embodiment, the generated lens model may be applied to deblur a new image.

In various embodiments, the generated lens model may be a global or local model. The global lens model may approximate the blur of an entire image field of a lens while a local lens model may approximate the blur in a local region of a lens image field. In some embodiments, multiple local lens models may be used, with each model approximating the blur in each local region of a lens image field. In some embodiments, the global or local lens models may include Gaussian approximations of the blur that may minimize the difference between a location within a reference image and a corresponding location of a pre-determined, known geometric pattern. Use of Gaussian approximations to model a spatially variant blur pattern of a lens may yield improvements over other lens models, yet may conserve computational resources.

Figure 1:
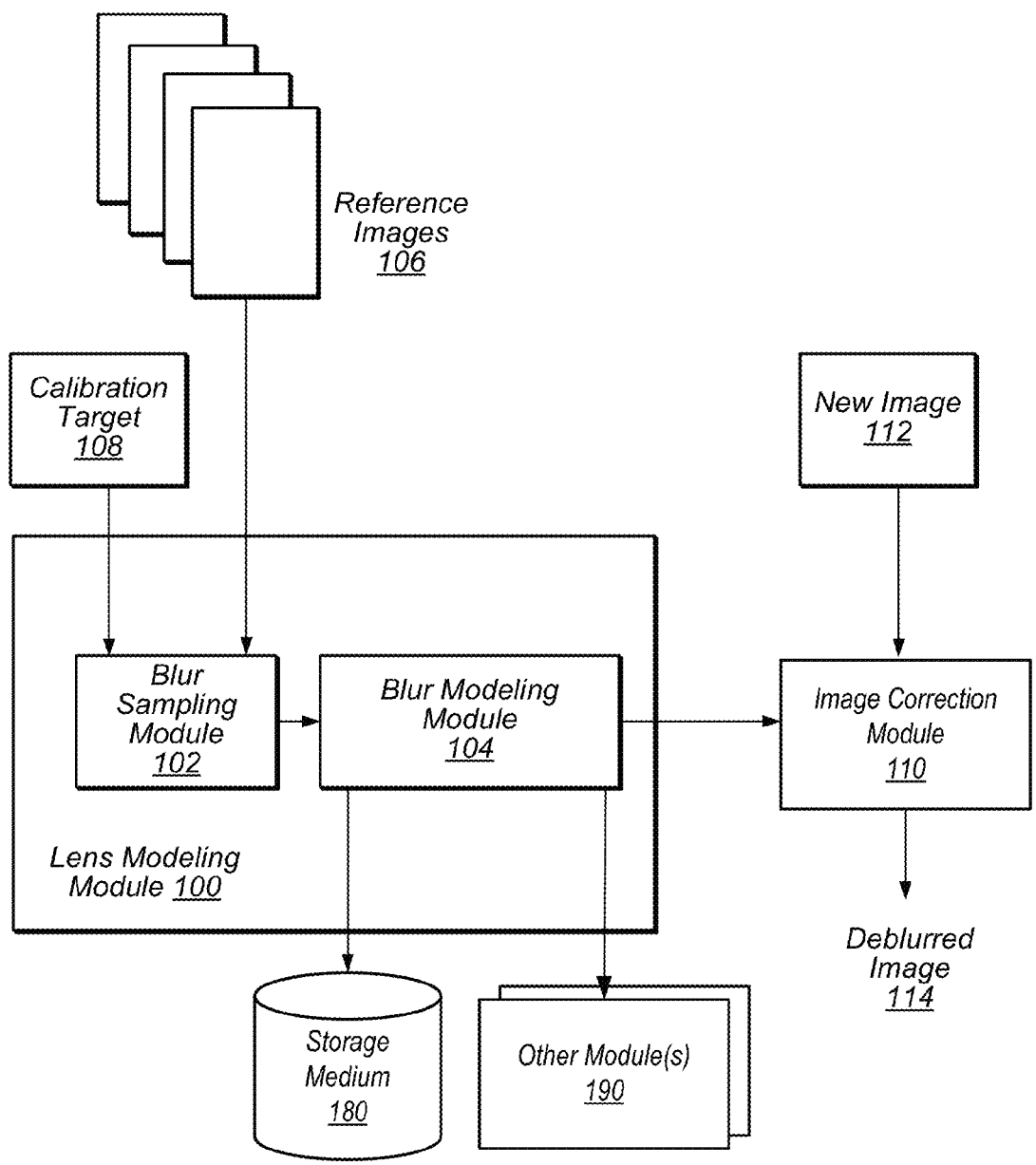
FIG. 1 illustrates an example module that may implement a lens modeling method, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Digital cameras may store one or more camera/lens parameters in metadata (e.g., EXIF data) of images captured with the camera. The stored parameters may include: focal length, focus distance, aperture, and sensor format factor. The focal length (F) of a camera/lens combination refers to the perpendicular distance from the perspective center of the lens system to the image plane, also known as the principal distance. The focus distance is the actual distance of the camera from the subject being photographed, and may also be referred to as the subject distance. The lens aperture of a camera, or aperture, refers to the adjustable opening in the iris diaphragm of a camera that determines the amount of light that will pass through the lens during exposure. Aperture is typically specified as an f/number (e.g., f/8, f/11). The smaller the f/number, the more light passes through. The sensor format factor of a digital camera refers to the dimension of the camera's sensor imaging area relative to the 35 mm film format. Specifically the sensor format factor is the ratio of a 35 mm frame's diagonal (43.3 mm) to the diagonal of the image sensor in question, e.g., $\text{diag}_{35mm}/\text{diag}_{sensor}$. The sensor format factor may also be referred to as the camera's crop factor, or the focal length multiplier.

A lens profile may be defined as a file that contains a model description for a specific camera body and lens combination. A lens profile may be read by an image processing application to specify aberration corrections, including lens aberration corrections, to images captured with the respective camera/lens combination. Embodiments of a lens modeling module, described herein, may generate a lens profile that includes models for correcting multiple types of aberrations, including lens aberration corrections, in a single pass from a single set of captured calibration/reference images, where a single calibration chart is captured in each calibration image from a different perspective (i.e., unique focal length and aperture combinations). Such a lens profile may model image blur which may vary spatially across an image. The lens profile may include a mathematical model which may be used to reduce the image blur of a captured image. Some embodiments of the lens modeling module may be implemented, for example, as a plug-in for or module in an image processing application.

A captured image may include image blur which may vary spatially across the image. For example, the center of a captured image may be sharp, but other areas of the image may be blurred. The amount of image blur may increase across the image, from a minimum (or zero) image blur at the center of the image to a maximum amount of blur at the image corners. The amount of image blur at a particular area on the image may be a function of the spatial location of the area on the image. In addition, image blur may be asymmetric.

The amount of image blur in a captured image may be a function of the specific camera body, the lens, and the camera/lens settings (e.g., focal length and aperture) that are used to capture the image. The system for generating lens models to reduce image blur may consider the spatial variation of image blur across an image and, dependent on the spatial variation, may generate a lens model for a particular camera, lens and camera/lens settings. The system may apply the lens model to reduce blur in a newly captured image.

Various embodiments of a system and methods for creating lens models are described. In embodiments, multiple images of a calibration chart may be captured using a camera/lens combination. The multiple images may be input to a lens modeling module. The lens modeling module may analyze the calibration chart information in the multiple images and generate mathematical models for correcting aberrations, including lens aberrations, in images captured with the camera/lens combination. Aberrations that may be modeled include lens aberrations, such as image blur, geometric distortion, lateral chromatic aberration, and/or vignetting.

Some embodiments may include a means for modeling a lens profile. For example, a lens modeling module may receive input reference images of a calibration target as well as information about the calibration target, and may generate a lens model that approximates aberrations in the lens, as described herein. The lens modeling module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input reference images of a calibration target as well as information about the calibration target, and may generate a lens model that approximates aberrations in the lens, as described herein. Other embodiments of the lens modeling module may be at least partially implemented by hardware circuitry and/or firmware stored, for example, in a non-volatile memory.

Turning now to FIG. 1, lens modeling module 100 may implement one or more embodiments of lens modeling techniques, as described herein. In the embodiment shown, lens modeling module 100 may receive reference images 106 and information (e.g., dimensions, orientation, etc.) from calibration target 108. Lens modeling module 100 may implement blur sampling module 102 and blur modeling module 104 and output a lens model to image correction module 110. Lens correction module 110 may receive the lens model and a new image 112 and output a deblurred version of new image 112, deblurred image 114.

Figure 2:
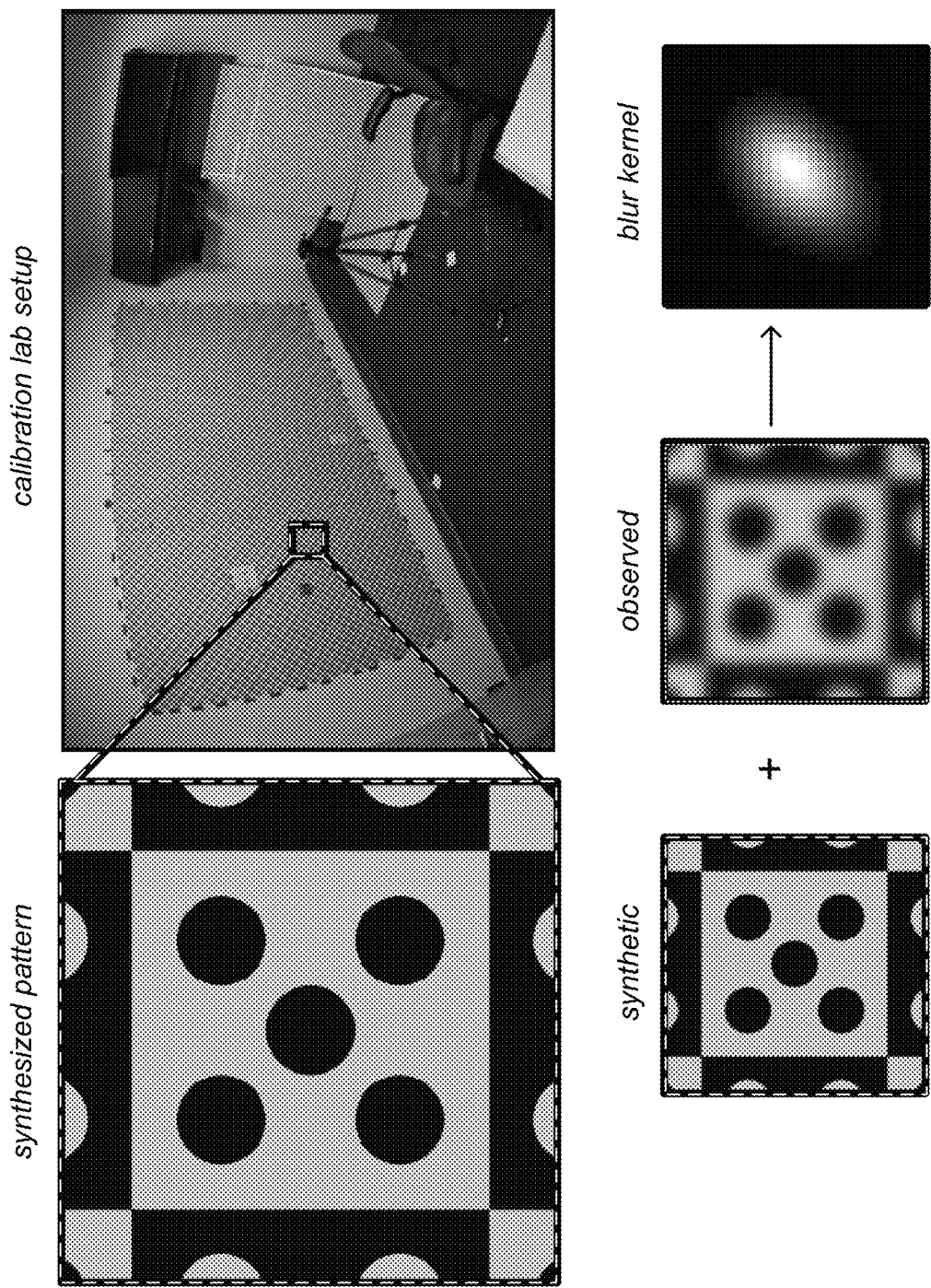
FIG. 2 illustrates an example of a calibration pattern, according to some embodiments.

Lens modeling module 100 may receive, as input, a plurality of reference images 106 and information from calibration target 108. Calibration target 108 may include a black and white geometric pattern with known, or pre-determined, proportions. One embodiment of calibration target 108 is illustrated in FIG. 2. In the illustrated embodiment, calibration target 108 may consist of a pattern, as shown in the upper left image of FIG. 2. The portion of the pattern shown in FIG. 2, a white square with five black dots, may be referred to as a patch, location, region, or area of calibration target 108. Calibration target 108 may be an array of small patches of the geometric pattern. In one embodiment, each patch may have at least three straight edges of different orientation. Straight edges may be useful in detecting blur because straight edges that are perfectly reproduced may remain straight while straight edges that are blurred may result in skewed edges. The geometric pattern of a patch in calibration target 108 may be repeated in other patches across the calibration target 108. One embodiment of calibration target 108 is shown in the upper right image of FIG. 2. In the embodiment shown, calibration target 108 is mounted to a wall, or other vertical surface. As shown in FIG. 2, calibration target 108 may include an alternating pattern of squares with dots, with the squares and dots alternating colors. For example, the first square in a pattern may be a white square with five black dots, the second square may be a black square with five white dots, the third square may be a white square with five black dots, and so on. Another example of calibration target 108 may include patches with diamonds, triangles, circles and other shapes of various colors. In one embodiment, calibration target 108 may contain a mathematical definition that may include information about the dimensions, orientation, colors, shapes, and lines. The known information may be provided to lens modeling module 100. For example, in one embodiment, each patch may be a 2 inch by 2 inch white square, with a single black dot with diameter of 1 inch, centered in the white square, with calibration target 108 being 40 patches wide by 20 patches high. That information may be provided to lens modeling module 100.

Turning back to FIG. 1, lens modeling module 100 may also receive, as input, a plurality of reference images 106 of calibration target 108. As shown in the upper right image of FIG. 2, a camera may be mounted on a tripod to capture reference images 106. Each reference image 106 may be captured with a unique aperture and focal length combination. In one embodiment, the plurality of reference images 106 may include four images of calibration target 108. The four reference images 106 may include: an image taken with a camera's minimum focal length and minimum aperture, an image taken with minimum focal length and maximum aperture, an image taken with maximum focal length and minimum aperture, and an image taken with maximum focal length and maximum aperture. In one embodiment, the plurality of images includes images taken with intermediate focal length and aperture settings. In one embodiment, if calibration target 108 does not fill the camera's field-of-view in one or more of reference images 106 with a particular focal length and aperture, additional images may be taken using that particular focal length and aperture such that the additional image(s) collectively cover the camera's field-of-view. For each additional image, calibration target 108 or the camera may be moved to a new position to take the image.

Figure 3:
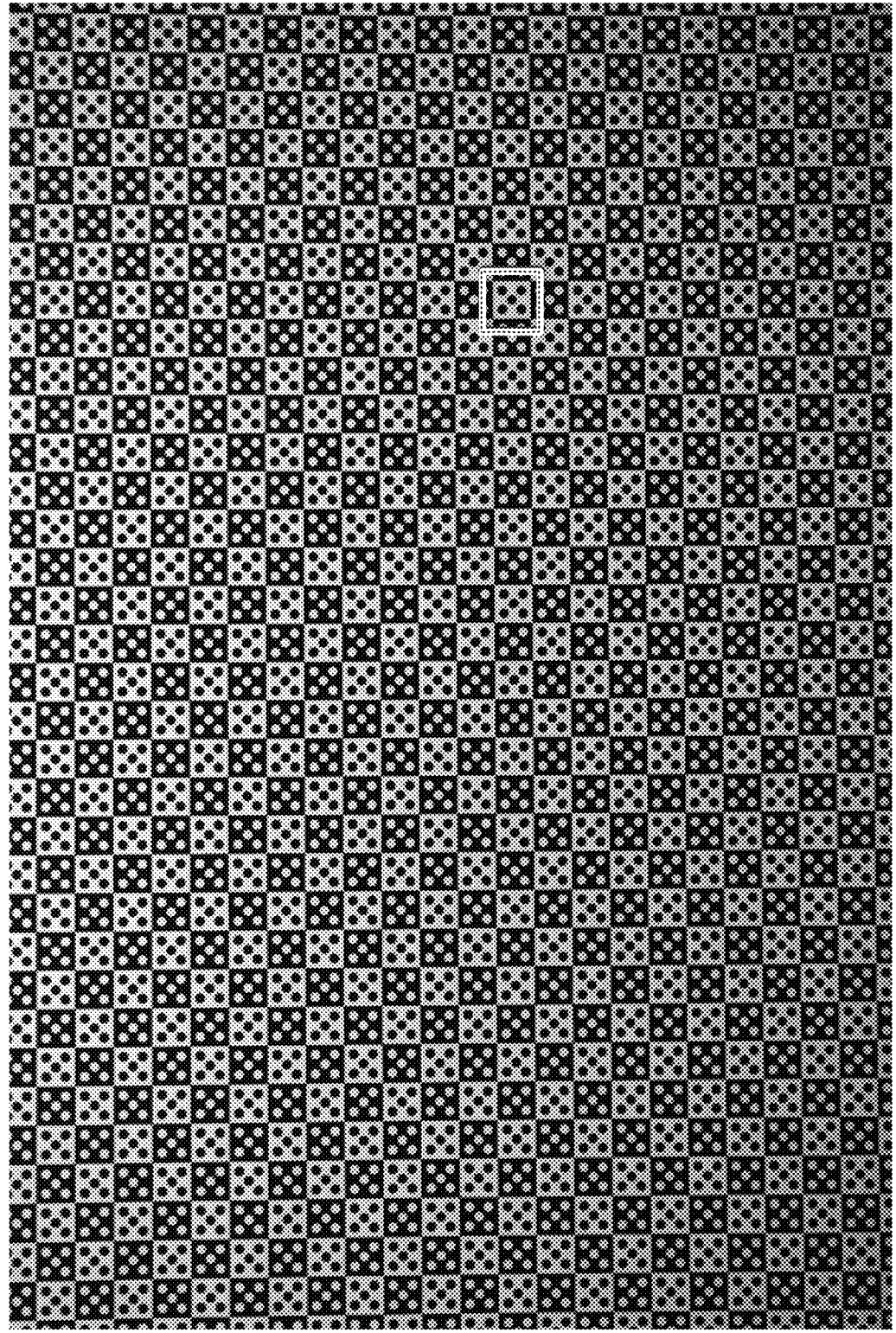
FIG. 3 illustrates an image of a calibration pattern with an example of an area of the image that may be blurred.

One example of a portion of reference image 106 is shown in the lower middle image of FIG. 2, labeled observed. Note the blur in the reference image shown in FIG. 2 when compared to the synthetic data. In some embodiments, images of actual content, rather than images of a calibration pattern, may be used as reference images 106 for the lens modeling system. For example, images with content such a night sky filled with stars may serve as reference images 106 from which image blur may be sampled. Another example of a reference image 106 of calibration target 108 is illustrated in FIG. 3. The example reference image 106 was taken with a 37 mm lens with an aperture of 4.5. As shown, calibration target 108 may include repeated patches of a synthesized pattern. As discussed herein, lens modeling module 100 may find the corners of the calibration pattern patches and may use the circles of the other pattern to estimate an amount of blur (e.g., a blur sample) for each instance of a calibration pattern patch.

The area bounded by the box in FIG. 3 is an example of a patch of calibration target 108.

Referring again to FIG. 1, lens modeling module 100 may implement blur sampling module 102 and blur modeling module 104 to generate a lens model. In some embodiments, blur sampling module 102 may receive reference images 106 and information from calibration target 108 as inputs. Blur sampling module 102 may estimate the image blur, which may include computing a blur kernel, also known as a point spread function for optical blurs, for small patches of reference images 106. In one embodiment, each small patch may be aligned to the mathematical definition of calibration target 108 and a sharp patch may be synthesized, shown in the lower left image of FIG. 2, labeled synthetic. Then, a blur kernel, such as a non-parametric blur kernel, may be estimated by using the small patch and the sharp patch. One example of a non-parametric blur kernel for a small patch of calibration target 108 is shown in FIG. 2, in the lower right image labeled blur kernel. The blur kernel may represent the shape of image blur for a particular region of an image. A blur kernel may be larger and in a diagonal orientation toward the corners of a lens image field. Further, blur kernels may be asymmetric across a lens image field.

Turning back to FIG. 1 and blur sampling module 102, in one embodiment, non-parametric blur kernels may be computed to describe the blur in small regions of reference image 106. For each region of a reference image 106, the mathematical definition of calibration target 108 may be aligned to that region and a sharp region may be synthesized. In one embodiment, each region of calibration target 108, and as a result, each region of reference image 106 may be a square with five circles in the square as seen in FIG. 2. The corners of the square may be localized and a bootstrap projective homography, H, may be computed that may align the calibration target 108 to the square. The homography may be used to rasterize a synthetic image of the square from its mathematical definition. In one embodiment, calibration target 108 edges may be anti-aliased by computing the fraction of the pixel that is filled and the white/black point may be set to the histogram peaks in the imaged square. The homography may be iteratively refined. In the ith iteration, a coarse-to-fine differential registration technique may be used to compute a projective homography $H_i$ that may align the synthetic square to reference image 106. The homography may be updated, $H \leftarrow H_i H$ and the synthetic image may be re-rasterized. The iterative process may terminate when $H_i$ is close to an identity. The resulting homography may give sub-pixel alignment between the mathematical definition of calibration target 108 and the blurry square of reference image 106.

In one embodiment, non-parametric blur kernels may be estimated for each square by synthesizing a sharp square from the aligned calibration target 108. The non-parametric blur kernel may be a 2D description of what an image of a single point of light, at a particular location in an image, may look like when captured with a particular camera and lens, with particular focal length and aperture settings. A non-parametric blur kernel may be computed from the variance between the synthesized calibration pattern and the observed captured pattern in the image, using a non-parametric function. In one embodiment, the blur kernel may be computed by using conjugate gradient descent to solve the least squares system $Ak=b$, where k is the kernel, A is a Toeplitz matrix that encodes the convolution of the sharp square with the kernel, and b is the blurry square. The optimization may be computed in the Fourier domain without explicitly constructing A. In one embodiment, using conjugate gradient descent may allow negative kernel values. If so, they may be removed by thresholding and re-normalizing the kernel.

The blur kernel may be super-resolved because in some cases, optical blurs may be small. The homography H, which may be known to sub-pixel accuracy, may be used to synthesize a high resolution calibration target 108. The linear system may then become $WA_r k_r = WUb$, where $A_r$ and $k_r$ may encode the high-resolution calibration target 108 and kernel. Matrix U may up-sample b and W may be a weight matrix that may assign zero-weight to interpolated pixels. By formulating with U and W, matrix $A_r$ may not need to be constructed and the convolutions may be performed in the Fourier domain. Computations in the Fourier domain may be faster than non-negative least squares and a smoothness regularization term may not be necessary. In some embodiments, the super-resolved kernels may be super-resolved by using conjugate gradient descent to solve $WA_r k_r = WUb$ with $W=I$. This may have the effect of putting a smoothness constraint on the kernel. In one embodiment, the kernels may be super-resolved at 3× image resolution.

Non-parametric kernels can describe complex blurs but their high dimensionality may mask the relationship between the kernel shape and optical parameters. In one embodiment, a 2D Gaussian distribution may be computed that may reduce the dimensionality. The 2D Gaussian distribution may represent the shape of the image blur (blur kernel). The computation may be performed in a variety of ways. In one embodiment, a Gaussian may be fitted to the central, connected, probability mass in the non-parametric kernel using a maximum likelihood (ML) estimator. Then, the error between the Gaussian and non-parametric kernel may be minimized iteratively. In some embodiments, other algorithms may be used to approximate the image blur for each patch.

Figure 4:
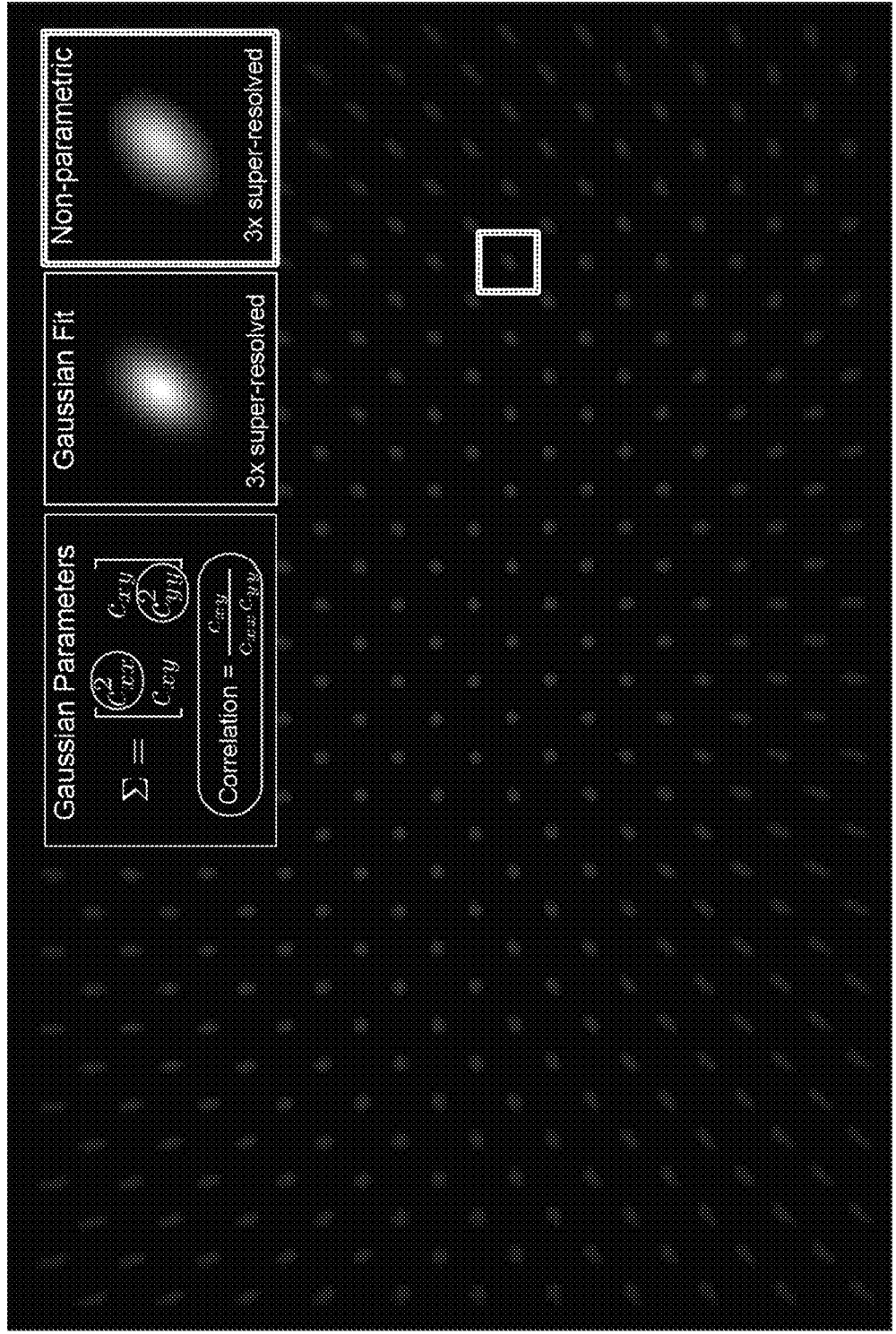
FIG. 4 illustrates an example of blur samples using Gaussian parameters that may be generated for a lens, according to some embodiments.

Each blur sample represented may be a location tuple (x,y, f,a), where x and y may represent an (x,y) coordinate location on the sensor, f may represent the focal length and a may represent the aperture setting. Each blur sample may have a corresponding blur tuple ($c_{xx}$, $c_{yy}$, cor), where $c_{xx}$ may represent the x-standard deviation, $c_{yy}$ may represent the y-standard deviation, and cor may represent the correlation of the Gaussian distribution. The elements of the blur tuple may be the three circled elements of the Gaussian distribution illustrated in FIG. 4 as Gaussian Parameters. Also illustrated in FIG. 4 is an example of blur samples for an image field of view created by a 37 mm lens with aperture of 4.5. Labeled as a Gaussian Fit in FIG. 4 is the blur sample created by 2D Gaussian distribution of one patch of the image field shown. The Gaussian Fit is contrasted in the figure to a non-parametric blur kernel. As seen in FIG. 4, the Gaussian Fit may be an accurate approximation of the non-parametric blur kernel.

Blur sampling module 102 may approximate a blur sample, and corresponding blur tuple, for each patch of the calibration image. For example, blur sampling module 102 may compute a Gaussian approximation that represents each blur sample across the image. The Gaussian approximation for a blur sample may include three elements, $c_{xx}$, $c_{yy}$, and cor. Thus, each patch of an image may be represented by the three elements of the Gaussian distribution. This process may be repeated for each calibration image, captured at different focal lengths and aperture settings. In some embodiments, the spatial variation of a blur may be complex. For example, if the Gaussian approximations change in an unusual way, it may be helpful for the system to use additional reference images 106 to better approximate the blurs.

Referring back to FIG. 1, the blur samples may be used by blur modeling module 104 to determine a mathematical model that describes how the blur samples vary across an image field of a lens (sensor) for a particular focal length and aperture setting. Blur modeling module 104 may use the blur samples to compute a blur model that may predict the value of each blur tuple, given the corresponding location tuple. The resulting blur model may be a global or local model. Further, the blur model may model the blur in each color channel separately. In one embodiment, a global model may include three functions, $Gc_{xx}$(x, y, f, a), $Gc_{yy}$(x, y, f, a) and $G_{cor}$(x, y, f, a). Each of the three functions may predict one of the values in the blur tuple. For example, $Gc_{xx}$ may predict $c_{xx}$, $Gc_{yy}$ may predict $c_{yy}$, and $G_{cor}$ may predict cor. In one embodiment, each of the three functions may consist of the same mathematical form. For example, each function may be a polynomial $G_{N,M}$ in x, y, f, and a up to order max (N,M). In one embodiment, f and a terms above order M may be removed from the functions. By removing certain higher order terms in the function, computation time may be reduced further. Further, higher order focal length and aperture terms may only have a trivial effect on the image blur at a particular location, and thus, may not add significant additional accuracy, if those terms remain. In one embodiment, the G functions may be 8th order polynomials with f and a terms above order 3 removed. For example, consider a function $h(x,a)=1+x+a+x^2+xa+a^2+x^3+x^2a+xa^2+a^3$. Removing the a terms above order 3 would yield $h(x,a)=1+x+a+x^2+xa+x^3+x^2a$. In an embodiment with N=8 and M=3, each polynomial function $G_{N,M}$ may have 356 terms.

Each function G(x,y,f,a) may be fit by computing the coefficient for each polynomial term. In one embodiment, G(x,y, f,a) may be linear in the unknown coefficients. As a result, the coefficients may be estimated using a standard least-squares method. Each of the three G(x,y,f,a) functions for a particular image location may have different coefficients. For each image location, the three G(x,y,f,a) functions may be solved (e.g., using a reduced term equation such as h(x,a) as shown above), using the determined coefficients to determine an amount of blur at the particular image location. The resulting values of the Gaussian distribution ($c_{xx}$, $c_{yy}$, cor) may represent three surfaces of the image blur.

Figure 5:
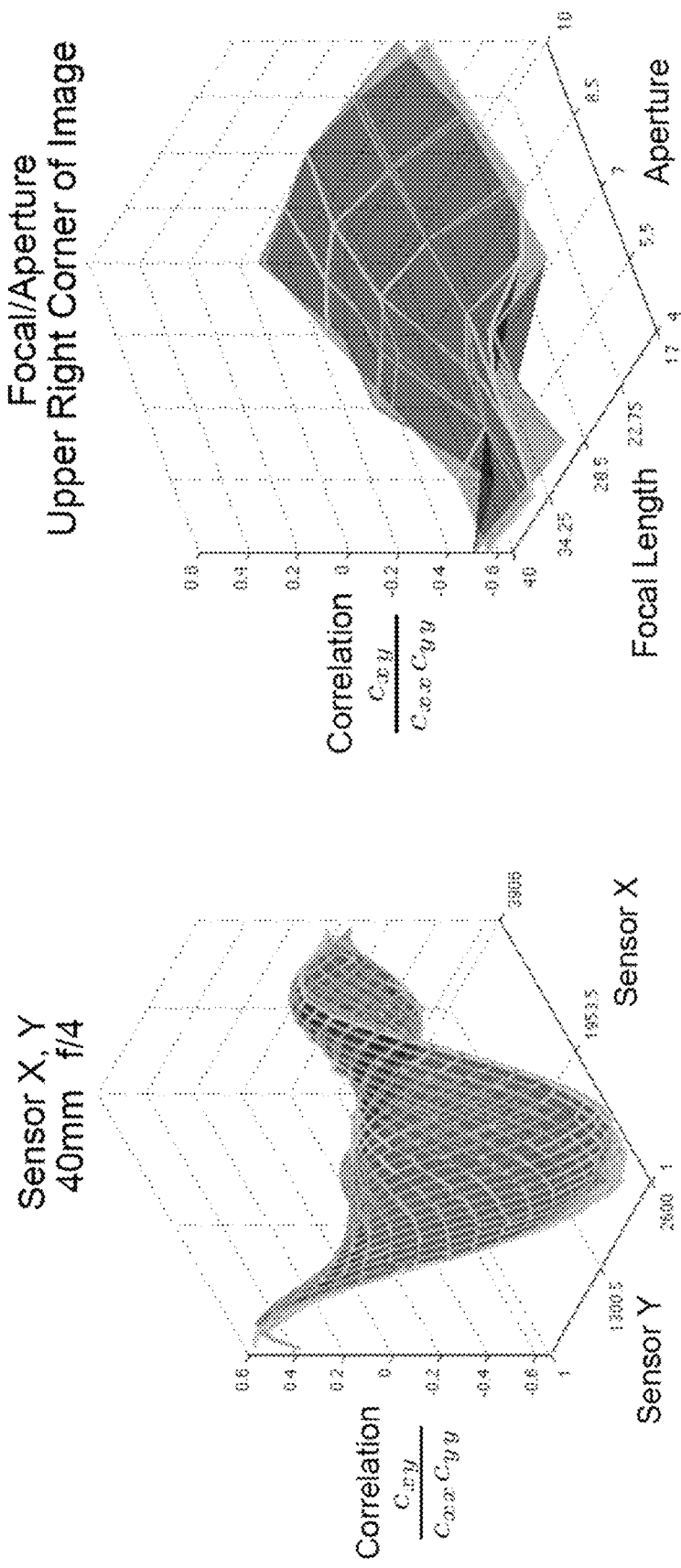
FIG. 5 illustrates an example of a portion of a global blur model, according to some embodiments.

FIG. 5 illustrates surface models of one example of the $G_{cor}$ function of a global polynomial model that may be generated for a lens using Gaussian parameters. The lower left image represents $G_{cor}$(x,y,f,a) with a fixed aperture and focal length, f, a. The lower right image represents $G_{cor}$(x,y,f,a) with a fixed (x, y) position in the upper right corner of the sensor field, with image blur typically being worse in a corner of the sensor field. This surface model graph illustrates that the affect of focal length and aperture on the Gaussian correlation term may be minimal, even for sensor field areas in which blur may be the greatest. Accordingly, this surface model graph shows that removing higher order f and a terms in the polynomials that represent the Gaussian parameters may not significantly impact the model.

Figure 6:
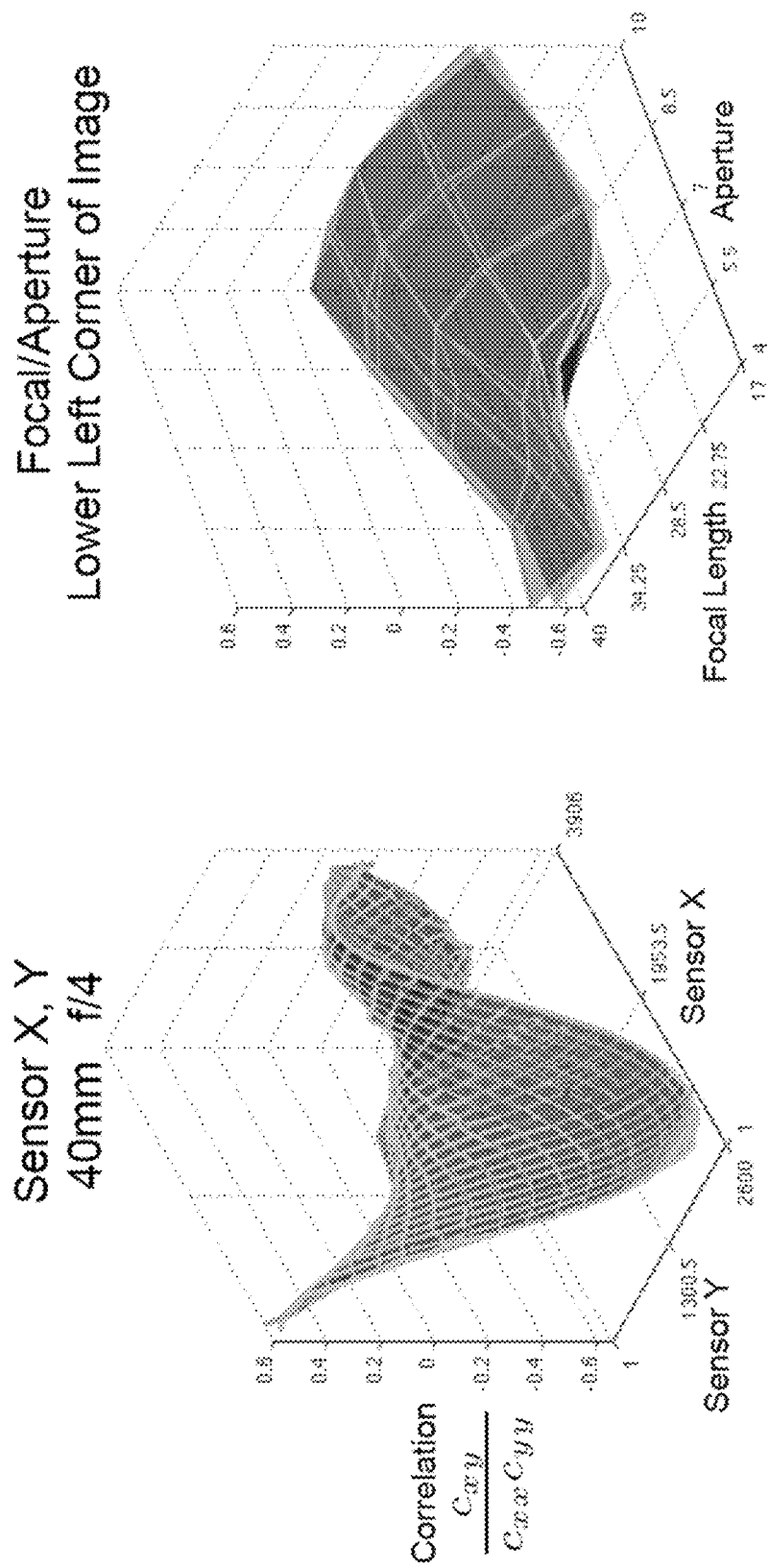
FIG. 6 illustrates an example of a portion of a local model that may be used to predict image blur in local regions of an image, according to some embodiments.

In some embodiments, one or more local models may be generated in addition to, or instead of, a global model. The local model may be used to predict the blur in small local regions of the image instead of predicting the blur for the entire image. In one embodiment, the local model may include three functions: $Lc_{xx}$(x,y,f,a), $Lc_{yy}$(x,y,f,a), $L_{cor}$(x,y, f,a). FIG. 6 illustrates example surface models for $L_{cor}$. The functions may predict the values of the blur tuple in a local region of the image. In one embodiment, each function may be a polynomial $L_{N,M}$ with x, y, f, and a terms up to order max (N,M) with x, y terms above order N removed. For example, $L_{1,3}$ may include 25 polynomial terms. Function L may be fit by computing the coefficients of each polynomial term using a standard least-squares method. The fit may be repeated for each local region. An image field may consist of a Kx-by-Ky grid of local regions. For example, an image field may include a 10×10 local region grid of 100 local regions. In the previous example with $L_{1,3}$, 100×25 polynomial coefficients may be required to predict one value in the blur tuple across an image. The parameter K may be selected so that the blur is approximately constant within each local region.

Values for the model parameters $G_{N,M}$ and $L_{N,M}$ may be determined based on tests executed on various camera lenses using both the global and local models described above. For each lens test, cross-validation may be performed using both the global and local models. To select a starting point for cross-validation, a set of images may be collected at fixed focal length and varied aperture. These images may be the same as reference images 106. The Gaussian kernels may be computed and $c_{xx}$, $c_{yy}$, and corr may be plotted at each x, y location as a function of aperture. The same may be repeated for a fixed aperture and varied focal length: a set of images of varied focal length and fixed aperture may be collected, Gaussian kernels may be computed, and $c_{xx}$, $c_{yy}$, and corr may be plotted at each x, y location as a function of focal length. An initial sampling resolution in f and a may be selected according to the rate at which the Gaussian parameters vary. After selecting a starting point for cross-validation, the complexity of the global and local models may be determined by cross-validating over N and M for either the global or local models. A cross-validation dataset of $Z_f \times Z_a$ images may be captured, where $Z_f$ and $Z_a$ may be the number of samples in the f and a dimensions. The sampling resolution may constrain the complexity of $G_{N,M}$ and $L_{N,M}$ to $M < \min(Z_f, Z_a)$. Cross-validation for the global model may be performed in two stages. Let $Z = \min(Z_f, Z_a)$. The mean prediction error of models $G_{N,Z-1}$ may be plotted against N and a value may be selected for N, let it be $N_{opt}$. Then, the mean prediction error analysis may be repeated for $G_{Nopt,M}$, where M<Z. M may then be selected accordingly. Cross-validation for the local model may be performed similarly.

The optimal parameter values, M, N for the global or local models may be the smallest values that do not result in overfitting and that decrease testing error. As an example, global model parameters may be N=8, M=3. As another example, local parameters may be N=1 and M=3. Note that other values may result from tests on different lenses and that other values may be used in various embodiments. The value of M may determine the minimum number of calibration images 106 that may be collected by a user in order to accurately represent the focal length and aperture settings. A larger number of reference images 106 may need to be collected by a user for larger values of M. Parameters Kx and Ky, which may define the grid of local regions for the local model, may not be optimized via lens testing. In some embodiments, ranges for parameters Kx and Ky may be 10<=Kx<=20 and 10<=Ky<=20. In other embodiments, other ranges may be used for Kx and Ky. The radius of the local model and the calibration target 108 resolution may be chosen to match the complexity of spatial variations. In some cases for stability purposes, the radius may be at least 2× the width of the largest imaged squares.

Either the global or local model may be used to predict blur across an image due to lens imperfection. Selection of an appropriate lens model may depend on a variety of tradeoffs. The global model may be fit with fewer x,y samples than the local model and therefore may require less user data collection. The global model, however, may be sensitive to noise in fitting and, as a result, may be difficult to fit for polynomial orders significantly larger than 8th order. Another example where it may be more difficult to fit a high order polynomial is a scenario where a lens is a complex shape. The local model may able to describe more complex blur variations and may be more likely to generalize a wider variety of lenses. In addition, the local model may be more stable for fitting and may be a simpler function, due to the lower order of the local model polynomial. The local model, however, may require that the user cover a larger percentage of the camera field-of-view in captured images of the calibration chart. In other words, more captured images may be necessary for smaller local regions. Further, the local model may require significantly more data storage for large Kx and Ky parameters.

In some embodiments, lens modeling module 100 may output the lens model computed by blur modeling module 104 as part of a lens profile. The lens model may, for example, be stored to a storage medium 180, such as system memory, a disk drive, DVD, CD, etc. The lens model may also be passed to one or more other modules 190 for further processing. The lens model may also be passed to image correction module 110.

Image correction module 110 may receive a lens model from lens modeling module 100 and new image 112. In one embodiment, image correction module 110 may output a deblurred version of new image 112, deblurred image 114. Not shown in FIG. 7, the deblurred image may be stored to storage medium 180, such as system memory, a disk drive, DVD, CD, etc. Also not shown, the deblurred image may also be passed to one or more other modules 190 for further processing.

In one embodiment, new image 112 is produced using the same lens and camera combination that captured the reference images 106. New image 112 may contain any visual content. New image 112 may include header information, such as the focal length and aperture setting, and provide that information to image correction module 110. In other embodiments, image correction module 110 may receive the focal length and aperture setting in some other manner, such as input from a user of the system. Given a spatial location on an image and the camera, lens, focal length and aperture used to capture new image 112, image correction module 110 may use the lens model to determine an amount of image blur for the spatial location on the image. For example, image correction module 110 (or even lens modeling module 100) may compute a blur tuple at each desired spatial position (x,y) in the image. To compute the blur tuple at a spatial location, the image correction module 110 may evaluate either the global or the local lens model described above, with the corresponding location tuple. The computation may produce a set of blur tuples, each of which may be used to synthesize a 2D Gaussian blur kernel (with zero mean). Using the calculated Gaussian terms, the image blur at the particular location may be corrected for the image. The local image content around each (x,y) position may be deblurred using the Gaussian kernel. The system may use a variety of methods to deblur the image using the Gaussian kernel. For example, the system may use a non-blind deconvolution method or other comparable algorithm.

Figure 7:
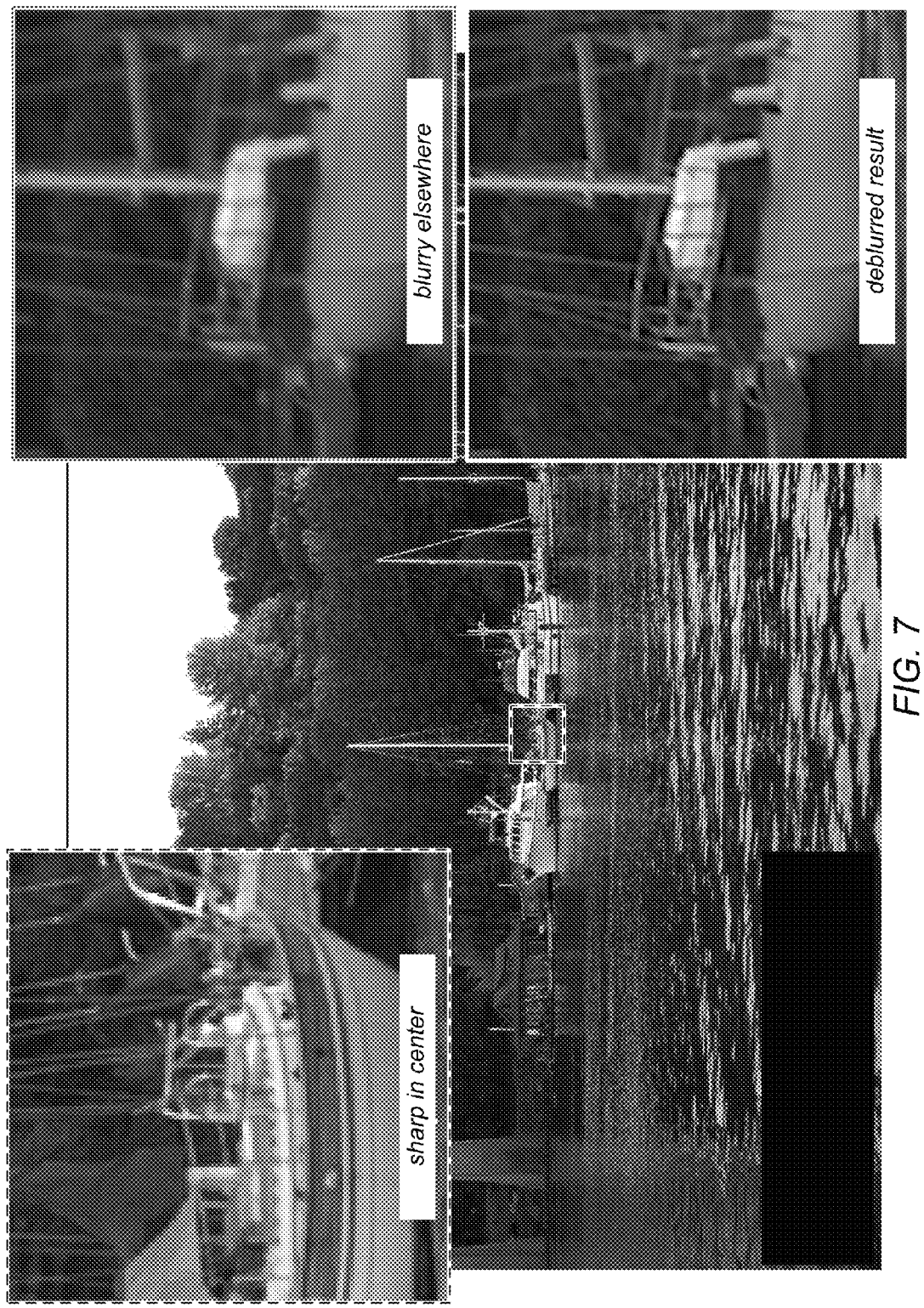
FIG. 7 illustrates an example of reducing image blur by applying the lens model to an image, according to some embodiments.

FIG. 7 illustrates one example of an image blur and a reduced image blur as performed by one embodiment of the disclosed lens modeling and blur correction system. As shown in the exploded image section in the upper left corner of FIG. 7, an image may be sharp in the center. Also shown, in the exploded image section in the upper right corner, is that the image may be blurred in areas that are not in the center of the image. In the lower right corner, a deblurred version of the previously blurred area of an image (as shown in the upper right corner of FIG. 7) illustrates an example of reducing image blur by applying the lens model to a captured image.

Figure 8:
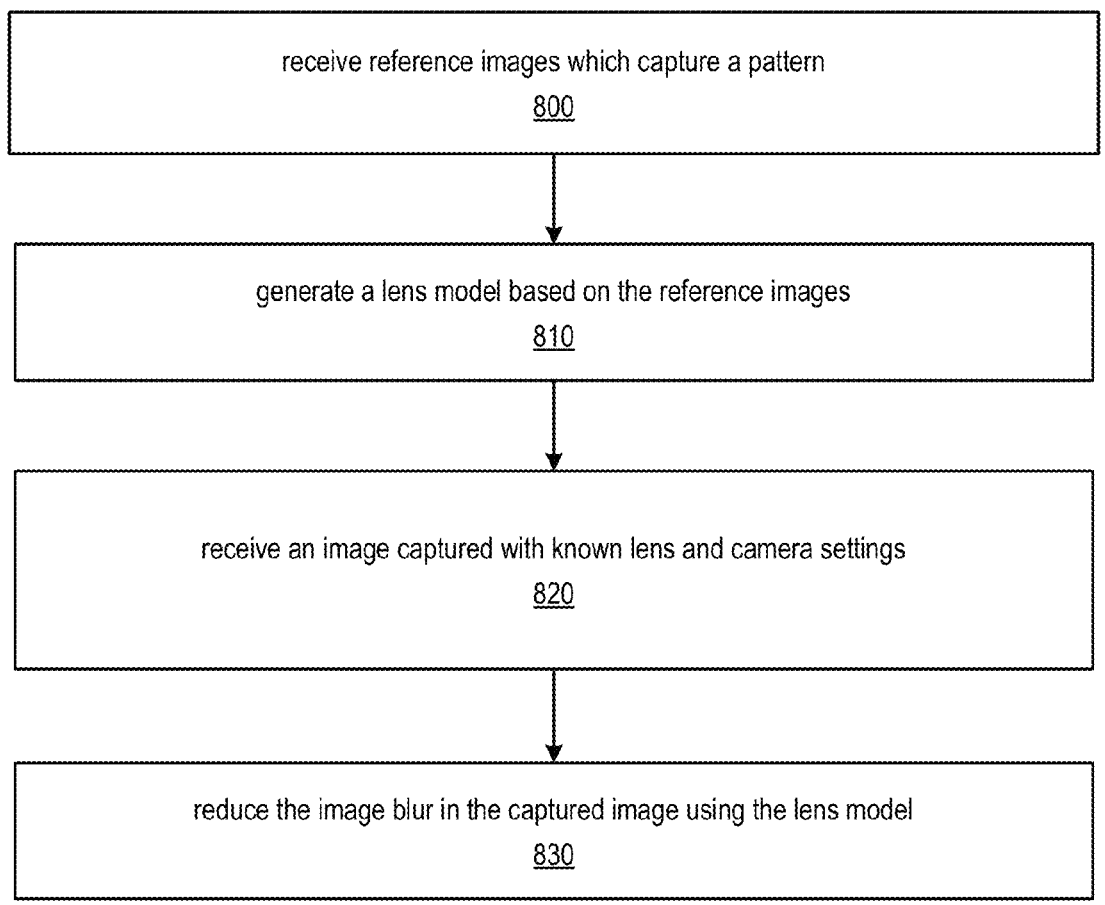
FIG. 8 illustrates a flowchart of an example method for creating a lens model, according to some embodiments.

Turning now to FIG. 8, one embodiment of a method for modeling a lens and applying a lens module to deblur a new image is shown. In one embodiment, the method may be performed by lens modeling module 100 and image correction module 110, as described herein. In some embodiments, the method of FIG. 8 may include additional (or fewer) blocks than shown.

At 800, the method receives reference images 106 that capture a pattern. In one embodiment, the pattern may be a black and white geometric pattern with known proportions. For example, the pattern may include an alternating pattern of squares with dots, where the square and dots are alternating colors. The pattern may include an array of patches of the geometric pattern that repeat a synthesized pattern. In one embodiment, each patch may include at least three straight edges of different orientation. Reference images 106 may include four images, in one embodiment. For example, the four images may include an image taken with a camera's minimum focal length and minimum aperture, an image taken with minimum focal length and maximum aperture, an image taken with maximum focal length and minimum aperture, and an image taken with maximum focal length and maximum aperture. In one embodiment, if the pattern does not fill the camera's field-of-view for one of the reference images of a given focal length and aperture, then the method of FIG. 8 may receive additional image(s) of the pattern, with the same focal length and aperture, which may collectively fill the field-of-view.

At 810, the method generates a lens model based on reference images 106. In one embodiment, generating a lens model may include estimating a blur at each location of the plurality of images and computing a model to fit the approximated blurs. In one embodiment, estimating the blur may include computing a Gaussian distribution that may minimizes the difference between each location of the plurality of images and the corresponding location of the known geometric pattern (i.e., the synthesized pattern). The Gaussian distribution may represent the shape of the image blur.

The resulting lens model may be a global or locally linear model or a combination thereof. In one embodiment, the global model may include three functions of location (x, y), focal length (f), and aperture (a). In some embodiments, higher order f and a terms may be removed. For example, in one embodiment, f and a terms above order 3 are removed. Removing the higher order f and a terms may nevertheless result in an accurate model, yet may also reduce complexity and computation requirements. In one embodiment, a locally linear model may include three functions of (x, y, f, a). The functions may predict blur tuple values in a local region of an image. In one embodiment, x and y terms above a certain order may be removed. For example, x and y terms above order 1 may be removed to once again reduce complexity and computation requirements. The image field may consist of a grid of local regions, each of which may have corresponding locally linear models applied to them. In one embodiment, the size of the regions is selected such that the blur is approximately constant within each local region.

At 820, the method may receive a new image of something other than the geometric pattern. In one embodiment, the new image may be captured using the same lens and camera combination that captured the reference images.

At 830, the method may use the lens model and an algorithm to deblur the new image. In one embodiment, the method may compute a blur tuple at each position in the new image by evaluating the lens model with the requisite location tuple. Then, a set of blur tuples may be produced that may synthesize a 2D Gaussian blur kernel. In one embodiment, the 2D Gaussian blur kernel and an algorithm, such as a deconvolution algorithm, may be applied to the new image to deblur local image content around each position.

Example System

Figure 9:
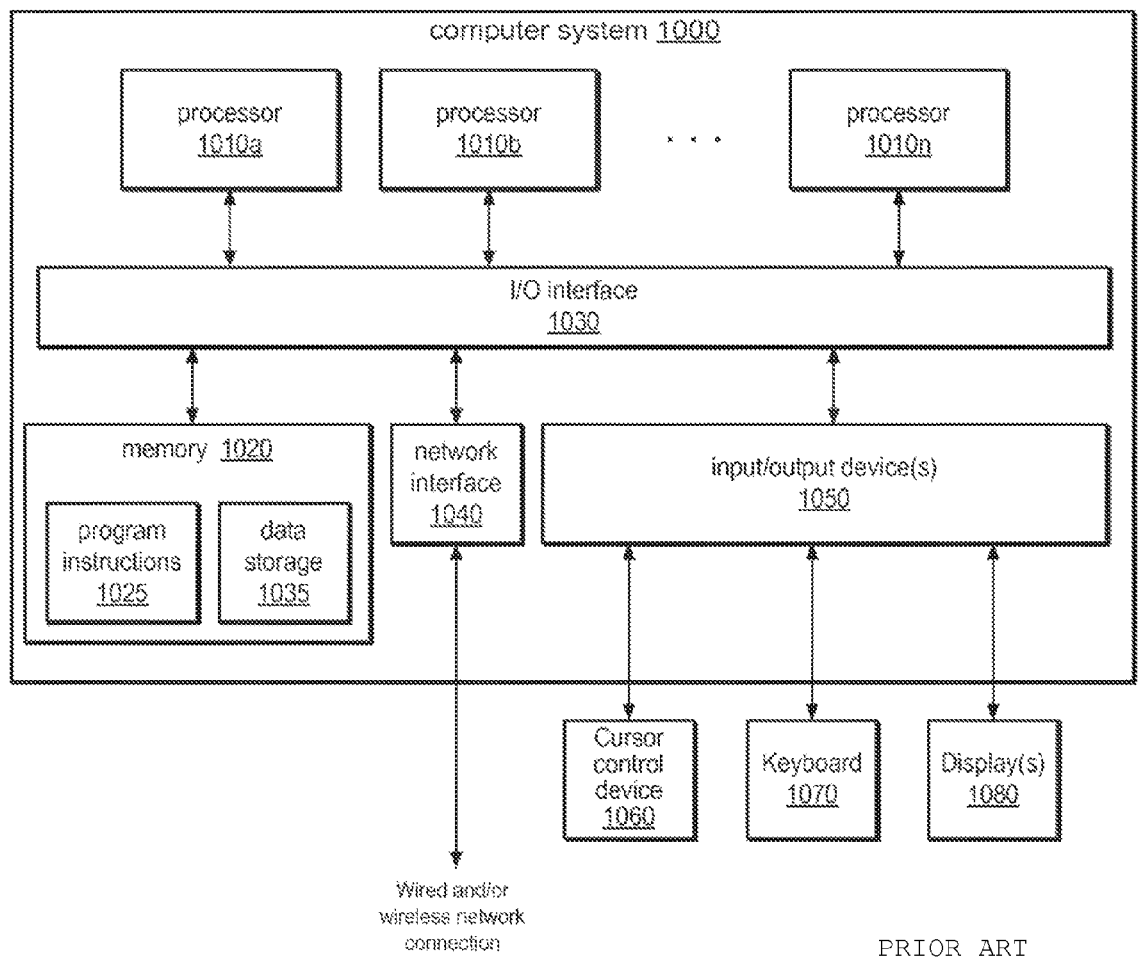
FIG. 9 illustrates an example computer system that may be used in some embodiments.

Embodiments of a lens modeling module and/or of the lens modeling techniques as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a lens modeling module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of a lens modeling module as described herein, and data storage 1035, comprising various data accessible by program instructions 1025. In one embodiment, program instructions 1025 may include software elements of embodiments of a lens modeling module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a lens modeling module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising: performing by a computer:
   receiving a plurality of images of a calibration target having a pre-determined geometric pattern of repeating patches, the plurality of images being configured to collectively cover an image field of a lens, the plurality of images including a first image with a first focal length and a second image with a second focal length that is different than the first focal length;
   determining changes in image blur with respect to the repeating patches indicative of a spatially variant blur pattern by at least estimating image blur for multiple patches of the pre-determined geometric pattern across the plurality of images of the calibration target, the image blur being estimated by at least:
      aligning each of the repeating patches with a mathematical definition of the calibration target; and
      based on said aligning, generating a plurality of blur kernels that describe blur associated with corresponding patches from the repeating patches; and
      based on the image blur that is estimated from the plurality of images, generating a lens model that represents the spatially variant blur pattern across the image field of the lens.

2. The method of claim 1, wherein the generating the lens model comprises:
   estimating a blur at each location of the plurality of images; and
   computing a model to fit the approximated blurs.

3. The method of claim 2, wherein estimating the blur includes computing a Gaussian distribution that minimizes a difference between each location of the plurality of images and a corresponding location of the pre-determined geometric pattern.

4. The method of claim 1, wherein the lens model comprises a global model, wherein the global model includes three polynomials that describe three parameters of a Gaussian kernel.

5. The method of claim 1, wherein the lens model comprises a plurality of locally linear models.

6. The method of claim 1, further comprising using the lens model to correct an image blur of a new image.

7. A system, comprising:
   a processor; and
   a memory storing program instructions executable by the processor to implement one or more modules configured to:
      receive a plurality of images of a calibration target having a known geometric pattern of patches, the plurality of images including a first image and a second image, the first image having a first focal length that differs from a second focal length of the second image;
      identify image blur for each instance of a patch in the geometric pattern across the plurality of images to determine changes in image blur with respect to the geometric pattern of patches indicative of a non-homogenous blur field, the image blur being identified based on:
         alignment of each said instance of the patch with data that defines the calibration target; and
         generation of a blur kernel that describes image blur associated with the patch based on the alignment; and
      generate a lens model based on the identified image blur that represents the non-homogenous blur field across the lens.

8. The system of claim 7, wherein the lens model is generated based on:
   computation of a two-dimensional Gaussian distribution of a blur in a plurality of areas of the plurality of images, wherein the computation includes minimization of a difference between the plurality of areas of the plurality of areas and the known geometric pattern; and
   computation of a model to fit the Gaussian approximated blurs.

9. The system of claim 7, wherein the lens model comprises at least three polynomials that describe three parameters of a Gaussian kernel.

10. The system of claim 7, wherein the lens model comprises a plurality of locally linear models.

11. The system of claim 7, wherein the one or more modules are further configured to using the lens model to adjust an image blur of a new image, wherein the new image is different from the images in the plurality of images.

12. A computer-readable storage medium other than a signal per se storing program instructions that are computer-executable to perform operations comprising:
   receiving a plurality of images of a calibration target having a pre-determined geometric pattern of patches, the plurality of images including a first image and a second image, the first image having an aperture different from an aperture of the second image;
   creating blur samples from the patches of the plurality of images, the blur samples being configured to represent locations on the plurality of images and represent one or more camera and lens parameters corresponding to the locations, the blur samples being created by at least:
      aligning each of the patches with a mathematical definition of the calibration target; and
      based on said aligning, generating a blur kernel for each said patch that describes image blur associated with the patch; and
   generating a global lens model and one or more local lens models corresponding to a camera and lens combination based on the blur samples created from the patches of the plurality of images that represents a spatially variant blur pattern across an image field for the camera and lens combination.

13. The computer-readable storage medium of claim 12, wherein the generating comprises:
   computing an approximation of a blur at each location of at least one of the plurality of images; and
   computing a model to fit the approximated blurs.

14. The computer-readable storage medium of claim 13, wherein the approximation of the blur at each location of the at least one of the plurality of images is a Gaussian approximation that minimizes a difference between each location of the at least one of the plurality of images and the corresponding area of the pre-determined geometric pattern.

15. The computer-readable storage medium of claim 12, wherein the global lens model comprises one or more polynomials that describe three parameters of a Gaussian kernel.

16. The computer-readable storage medium of claim 12, wherein the one or more local lens models comprises a plurality of locally linear models.

17. The computer-readable storage medium of claim 12, wherein the operations further comprise selecting the global lens model or one of said local lens models to adjust an image blur of a new image, wherein the new image is different from the images in the plurality of images.

\* \* \* \* \*